US011524317B2

(12) United States Patent
Illsley et al.

(10) Patent No.: US 11,524,317 B2
(45) Date of Patent: Dec. 13, 2022

(54) PROCESS FOR ELECTRON BEAM CURABLE INKJET FORMULATIONS

(71) Applicant: SUN CHEMICAL CORPORATION, Parsippany, NJ (US)

(72) Inventors: Derek Ronald Illsley, Bath (GB); Stephen Anthony Hall, Wells (GB)

(73) Assignee: Sun Chemical Corporation, Parsippany, NJ (US)

( * ) Notice: Subject to any disclaimer, the term of this patent is extended or adjusted under 35 U.S.C. 154(b) by 443 days.

(21) Appl. No.: 16/092,045

(22) PCT Filed: Apr. 10, 2017

(86) PCT No.: PCT/US2017/026757
§ 371 (c)(1),
(2) Date: Oct. 8, 2018

(87) PCT Pub. No.: WO2017/180496
PCT Pub. Date: Oct. 19, 2017

(65) Prior Publication Data
US 2019/0111452 A1 Apr. 18, 2019

Related U.S. Application Data

(60) Provisional application No. 62/449,168, filed on Jan. 23, 2017, provisional application No. 62/320,640, filed on Apr. 11, 2016, provisional application No. 62/320,657, filed on Apr. 11, 2016.

(51) Int. Cl.
B05D 3/02 (2006.01)
B05D 3/06 (2006.01)
B41J 11/00 (2006.01)
C09D 11/101 (2014.01)
C09D 11/30 (2014.01)
B41M 5/00 (2006.01)
C09D 11/32 (2014.01)
C09D 11/36 (2014.01)
C09D 11/38 (2014.01)
C08F 222/10 (2006.01)

(52) U.S. Cl.
CPC .......... B05D 3/0209 (2013.01); B05D 3/067 (2013.01); B05D 3/068 (2013.01); B41M 5/0023 (2013.01); C09D 11/101 (2013.01); C09D 11/30 (2013.01); C09D 11/32 (2013.01); C09D 11/36 (2013.01); C09D 11/38 (2013.01); B05D 2502/00 (2013.01); B05D 2506/25 (2013.01); B05D 2508/00 (2013.01); B05D 2518/00 (2013.01); C08F 222/102 (2020.02)

(58) Field of Classification Search
CPC ......... B05D 3/029; B05D 3/067; B05D 3/068
See application file for complete search history.

(56) References Cited

U.S. PATENT DOCUMENTS

| 5,260,349 | A | 11/1993 | Crivello et al. |
| 5,407,708 | A * | 4/1995 | Lovin ................. B41M 7/0081 101/212 |
| 5,527,578 | A | 6/1996 | Mazurek |
| 5,587,405 | A | 12/1996 | Tanaka |
| 6,429,235 | B1 | 8/2002 | Varlemann |
| 6,569,500 | B1 | 5/2003 | Sigel et al. |
| 6,730,363 | B1 | 5/2004 | Shah et al. |
| 7,270,408 | B2 | 9/2007 | Odell et al. |
| 8,476,334 | B2 | 7/2013 | Illsley et al. |
| 2003/0211299 | A1* | 11/2003 | Rajan ..................... G02B 5/124 428/195.1 |
| 2007/0027239 | A1 | 2/2007 | Weber et al. |
| 2007/0087131 | A1* | 4/2007 | Hutchinson ............. C08J 7/043 427/533 |
| 2008/0018695 | A1 | 1/2008 | Kadomatsu et al. |
| 2008/0090018 | A1 | 4/2008 | Inaba |
| 2009/0027198 | A1 | 1/2009 | Muraoka |
| 2009/0074982 | A1 | 3/2009 | Nakamura |
| 2010/0242757 | A1* | 9/2010 | Laksin ................. B41M 7/0081 524/451 |

(Continued)

FOREIGN PATENT DOCUMENTS

BE IN3549CHN2009 A 9/2015
EP 0 588 533 A2 3/1994

(Continued)

OTHER PUBLICATIONS

Merck KGaA, Darmstadt, Germany and/or its affiliates. Millipore Sigma. Periodic Table of Elements. (Year: 2019).*
U.S. Appl. No. 16/091,869, filed Oct. 5, 2018.
U.S. Appl. No. 16/091,386, filed Oct. 4, 2018.
International Search Report issued in International Application No. PCT/US2017/026755 dated Jun. 27, 2017.
Written Opinion of the International Searching Authority issued in International Application No. PCT/US2017/026755 dated Jun. 27, 2017.
International Search Report issued in International Application No. PCT/US2017/026749 dated Jun. 27, 2017.

(Continued)

Primary Examiner — Dah-Wei D. Yuan
Assistant Examiner — Kristen A Dagenais-Englehart
(74) Attorney, Agent, or Firm — Marian E. Fundytus; Ostrolenk Faber LLP.

(57) ABSTRACT

The present invention provides a method for printing energy-curable ink and coating compositions that have good adhesion to substrates, good print quality, solvent and scratch resistance, and low potential for migration of uncured monomers. The method comprises the steps of printing the ink or coating onto a substrate; partially curing the printed ink or coating by irradiating with UV energy; optionally printing and partially UV curing additional ink layers printed on the first layer; and completing curing via exposure to electron beam radiation, wherein the EB cure dose is greater than or equal to 20 kGy, and the accelerating voltage is greater than or equal to 70 keV.

15 Claims, No Drawings

(56) References Cited

U.S. PATENT DOCUMENTS

| | | | |
|---|---|---|---|
| 2010/0313782 A1* | 12/2010 | Loccufier | C09D 11/38 522/108 |
| 2011/0046257 A1 | 2/2011 | Webster | |
| 2014/0378561 A1 | 12/2014 | Van Berchum et al. | |
| 2015/0225585 A1* | 8/2015 | De Rossi | C09D 11/322 524/360 |
| 2016/0024329 A1* | 1/2016 | Zhang | C09D 11/02 522/64 |

FOREIGN PATENT DOCUMENTS

| | | |
|---|---|---|
| EP | 1 829 902 A1 | 9/2007 |
| EP | 2 233 540 A1 | 9/2010 |
| JP | 2003276178 A | 9/2003 |
| JP | 2003320744 A | 11/2003 |
| JP | 2003320746 A | 11/2003 |
| JP | 2004058566 A | 2/2004 |
| JP | 2004098309 A | 4/2004 |
| JP | 2004338100 A | 12/2004 |
| JP | 2005126509 A | 5/2005 |
| JP | 2006001226 A | 1/2006 |
| JP | 2010023488 A | 2/2010 |
| JP | 2016180072 A | 10/2016 |
| WO | WO 94/22596 A1 | 10/1994 |
| WO | WO 2014/063997 A1 | 5/2014 |
| WO | WO 2014/126720 A1 | 8/2014 |
| WO | WO 2015/049873 A1 | 4/2015 |
| WO | WO 2015/148094 A1 | 10/2015 |
| WO | WO 2016/164220 A1 | 10/2016 |
| WO | WO 2016/186838 A1 | 11/2016 |

OTHER PUBLICATIONS

Written Opinion of the International Searching Authority issued in International Application No. PCT/US2017/026749 dated Jun. 27, 2017.
International Preliminary Examination Report issued in PCT/US2017/026749 dated Oct. 16, 2018.
International Preliminary Examination Report issued in PCT/US2017/026755, dated Oct. 16, 2018.
International Search Report issued in International Application No. PCT/US2017/026757 dated Jul. 6, 2017.
Written Opinion of the International Searching Authority issued in International Application No. PCT/US2017/026757 dated Jul. 6, 2017.
International Preliminary Report issued in PCT/US2017/026757, dated Oct. 16, 2018.
Office Action issued in related U.S. Appl. No. 16/091,869 dated Oct. 2, 2019.
Office Action issued in related U.S. Appl. No. 16/091,869 dated Feb. 27, 2020.
Office Action issued in related U.S. Appl. No. 16/091,386 dated Jan. 27, 2020.
European Search Report issued in counterpart EP application No. 17 78 2901 dated Oct. 30, 2019.

* cited by examiner

PROCESS FOR ELECTRON BEAM CURABLE INKJET FORMULATIONS

CROSS REFERENCE TO RELATED APPLICATIONS

The present application is a § 371 National Stage application based on PCT/US2017/026757 filed Apr. 10, 2017, which claims the benefit of U.S. Provisional Application No. 62/320,640 filed Apr. 11, 2016, U.S. Provisional Application No. 62/320,657 filed Apr. 11, 2016, and U.S. Provisional Application No. 62/449,168 filed Jan. 23, 2017, the subject matter of each of which is hereby incorporated by reference in its entirety.

FIELD OF THE INVENTION

The present invention is related to improving print quality of energy curable ink and coating compositions by pinning the compositions by irradiating with UV radiation, followed by curing with electron beam radiation. The process of the present invention is suitable for use with inks and coatings that are essentially free of solvents. Cured prints prepared by the process of the present invention exhibit good cure, adhesion, and scratch and solvent resistance. The process of the present invention is suitable for applications requiring low migration inks and coatings.

BACKGROUND

Ultraviolet light (UV) reactive inkjet printing has become well known as a reliable printing method for graphic display and single pass applications, such as printing onto labels. More recently, by careful selection of raw materials, energy curable low migration inks and coatings have been produced. Within the market area of food packaging, single pass energy curing inkjet can be used where short runs are required, or there are advantages in eliminating time taken for image changeover; or to avoid the need to hold printed stock ("point of fill" printing). Thus, the overall print cost can be lower than conventional flexography or gravure printing. After printing, there is a cure stage, where photoinitiators (PI's) interact with UV light to form free-radicals which then react with double bonds in the acrylate monomers to initiate free radical polymerization, creating a colored image polymeric coating.

In an electron beam curing unit, electrons are produced from a filament, then accelerated through a vacuum, and passed through a foil window to exit the generation area. The beam then travels across a gap before passing into an ink layer on the carrying substrate. Here, the electrons may generate a free radical. Lead shielding is present to trap X-rays which may also be generated. The presence of oxygen above and in the film can consume the radicals created, therefore a layer of inert gas, usually nitrogen, is typically present in the curing area of the machine. This replaces the oxygen, and prevents the radicals being quenched.

The energy of a typical UV photon, particularly in the UVA and UVB regions of the UV spectrum, is below the chemical bond energy of acrylate monomers, meaning that the curing reaction cannot be initiated without the presence of a photoinitiator (PI). As the energy of electron beam (EB) electrons exceeds the bond energy of acrylate monomers, they can initiate cure without added PI. Problems of migration, taint, and odour associated with uncured photoinitiator and photoinitiator fragments are then eliminated. With EB curing, the relationship between the crosslink density and the resultant adhesion and chemical resistance will be altered compared to cure by ultraviolet light, which can give significant advantages.

IN3549CHN2009 discloses a method of producing printed 3-D objects by printing a mixture of two or more fluids by inkjet onto a support, at least partially curing the jetted mixture by actinic radiation or electron beam, and repeating the procedure to produce multiple layers of inks. The process builds a 3-D relief on the support.

US 2015/0225585 discloses solvent based inkjet inks that comprise at least two solvents, each having differing evaporation rates. The inkjet inks are free from photoinitiators and are electron beam curable.

JP 2010-023488 describes glass plates printed with UV inkjet inks which are then overprinted with an electron beam cured clear overcoating. The layers are composed of different ink formulations, and are cured separately.

US 2009/0207198 provides an offset printing method that used an inkjet system to print a UV ink onto a flat original plate, irradiating the printed image with UV or electron beam radiation to bring the ink into a semi-dried state, and then transferring the semi-dried ink image to a surface of an elastic blanket, and offset printing the ink image transferred to the elastic blanket onto a product. The offset printed ink image is then dried and fixed on the product.

US 2008/0018695 provides a recording apparatus that forms an image on a recording medium by printing two liquids, one of which is printed on top of the other, and then irradiating the liquids by irradiating with electron beam radiation. The electron beam device radiates the electron beam at an accelerating voltage of 40 kV to 60 kV.

JP 2006-001226 describes a method of manufacturing an inkjet recording material wherein a substrate is coated with an aqueous solution containing a polymer with an acetoacetyl group, and at least inorganic particulates. The aqueous solution is irradiated with an electron beam before drying.

JP 2005-126509 discloses an ink for inkjet printing that contains at least an oil-gelling agent and an electron beam curable composition.

JP 2004-338100 describes a coating layer that is composed of a water based paint that contains no radically polymerizable unsaturated bonds that forms a hydrogel when irradiated by electron beam. The coating layer is subsequently overprinted with a glossy layer.

JP 2004-098309 discloses an electron beam curable inkjet ink for printing onto metal coated plates that is cured efficiently under low accelerating voltage. The accelerating voltage is set to be no more than 150 kV.

JP 2003-320746 describes an inkjet receiving layer with improved adhesion on the support, wherein one of the coating layers comprises an aqueous paint that includes an electron beam curing component. Irradiation of the aqueous paint with the electron beam forms a hydrogel.

JP 2003-320744 discloses an inkjet recording body that is formed by coating a base material with an aqueous paint that includes an electron beam curing component. The coating layer forms a hydrogel when irradiated with electron beam radiation.

JP 2003-276178 discloses a radiation curable inkjet ink that can be cured, or the viscosity increased, by irradiating with visible light, UV, EB or IR radiation. No advantages of one type of radiation as opposed to the others are described.

JP 2016-180072 describes an inkjet composition that comprises a high concentration of any mixture of monofunctional and difunctional monomers. After EB curing, the inks have low odor and low migration potential.

WO 2016/164220 discloses water-based radiation curable inks that can be cured using EB radiation. The compositions may comprise photoinitiators, and may be partially cured using UV light prior to EB curing, but no examples are provided. Solvent free inks are not disclosed.

U.S. Pat. No. 5,407,708 discloses a flexographic printing system, and a method for applying and curing radiation cured inks. The inks are cured via a low dose of UV radiation, followed by a low dose of electron beam radiation. The goal is to use very low levels of energy for both the UV and electron beam radiation.

It has generally been a problem to achieve a good balance of adhesion and resistance (solvent, chemical), and low migration potential, in inks cured via electron beam radiation. Print quality, for example dot gain, bleeding, etc. has also been a problem with electron beam cured inks. In addition, it has long been believed that high doses of electron beams during curing would damage certain substrates, and therefore could not be used. Therefore, there remains a need in the art for a method to achieve the required print quality and low migration potential when using EB generators to cure inkjet applied inks and coatings.

SUMMARY OF THE INVENTION

The present invention provides a method for printing energy curable ink or coating compositions using a combination of UV and electron beam curing. By partially curing a printed ink or coating with UV radiation before the final electron beam curing, good print quality is achieved.

In a particular aspect, the present invention provides a method of printing an energy curable ink or coating composition comprising:
a) providing an energy curable ink or coating composition, wherein the energy curable ink or coating composition comprises:
  i) one or more multifunctional polymerizable monomers;
  ii) optionally, one or more polymerizable oligomers and/or monofunctional monomers;
  iii) 0.1% to 5% (w/w) one or more photoinitiators;
  iv) optionally, one or more solvents; and
  v) optionally, one or more colorants;
b) applying the ink or coating composition of step a) on a substrate;
c) exposing the applied ink or coating composition of step b) to UV radiation to partially cure the ink or coating composition, pinning the ink or coating composition to the substrate; and
d) exposing the partially cured ink or coating composition of step c) to electron beam radiation.

In another aspect, the present invention provides a method of reducing the amount of migratable monomer in a cured ink or coating using the printing method of the present invention.

In another aspect, the present invention provides a method for preparing an article with a low migration ink or coating thereon using the printing method of the present invention.

Other features of the present invention are described in more detail below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

An issue that has not been properly addressed in the prior art is how to achieve the required print quality when using EB generators to cure inkjet applied inks and coatings. Due to the cost and size of EB-curing apparatus it is likely that only one such unit be used to deliver the final required cure of any inkjet printed image. However, it is a recognised issue that without 'pinning' between printing stages there can be a loss of the achieved print quality due to both the spreading of the printed inks before they are cured, and the bleeding of inks into each other. For example, if a colour image is printed directly onto a previously printed white inkjet layer without that white being "pinned," the ensuing inks diffuse (bleed) into the white ink layer, causing a loss of colour and definition. Without a pinning step after applying inkjet fluids the inks may also spread on the substrate before any final curing stage, causing a loss of print definition.

Clearly, for any inkjet printing process with a final EB-curing stage it would be most desirable to pin the inks shortly after their being ejected from a printhead to ensure that final print quality is maintained. For the surface decoration of labels and other media, a white inkjet ink may be applied prior to the application of other colours. In this instance, it is highly preferable that the white ink should be pinned to ensure that the required print quality is achieved.

Disclosed is a method for printing energy curable ink and coating compositions wherein the printed ink or coating composition is partially cured with UV radiation before a final curing step with electron beam radiation. The method of the present invention enables the printing of multiple layers of ink or coating compositions without a loss of print quality. For example, ink spreading on the substrate, and bleeding of inks into one another is reduced.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer" or "monomers" is intended to include both monomers and oligomers, or mixtures thereof.

As used herein, the terms "inks and coatings," "inks," "compositions" and "fluids" are used interchangeably.

As used herein, a "multifunctional ink or coating" composition is one which comprises greater than or equal to 5% (w/w) of one or more multifunctional monomers.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

As used herein, "low migration" refers to the level of contamination of any packaged produce or product being less than 50 parts per billion (ppb) of any particular uncured monomer that may leach out of the ink or coating once it is cured on the substrate. 'Low migration' further means that contamination by photoinitiator residues should also be less than 50 ppb, or less than the specific migration limit existing for any specific photoinitiator. The methods of the current invention lend themselves to applications where higher conversion of monomer via energy curing is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material that could leach ('migrate') out of the ink into the surrounding environment thereby causing unwanted contamination. This is of particular concern for food packaging where any contamination of the packaged food from undesirable, migratable, ink components should be minimized. Therefore, any means to increase the conversion of such low molecular weight, low functionality monomers, during energy curing would be advantageous for the aforementioned sensitive printing applications. This is achieved by the methods of printing energy curable ink and coating compositions according to the current invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metallized foil (e.g. laminated aluminum foil), metallized polyester, a metal container, and the like.

Throughout this disclosure, all parts and percentages are by weight (wt % or mass % based on the total weight) and all temperatures are in ° C. unless otherwise indicated.

Process for Printing Electron Beam Curable Inkjet Formulations

UV pinning is an important aspect of printing via inkjet processes and is especially so in the case of single pass printing where the substrate passes under a fixed array of inkjet printheads, such as reel-to-reel printing of labels. In this case, there can be sufficient distance, and hence time delay, between the jetting of the inks and the final UV-curing station, that without pinning shortly after printing there would be a loss of image quality. A good definition of the pinning of UV-curable inkjet is given by (https://en.wikipedia.org/wiki/UV_pinning);

"UV pinning is the process of applying a dose of low intensity ultraviolet (UV) light to a UV curable ink (UV ink). The light's wavelengths must be correctly matched to the ink's photochemical properties. As a result, the ink droplets move to a higher viscosity state, but stop short of full cure. This is also referred to as the "gelling" of the ink.

UV pinning is typically used in UV ink jet applications (e.g. the printing of labels, the printing of electronics, and the fabrication of 3-D microstructures).

Purpose

UV pinning enhances the management of drop size and image integrity, minimizing the unwanted mixing of drops and providing the highest possible image quality and the sharpest colour rendering.

Challenge: Overcome the wetting problems that were causing UV-Curable inks to spread and cause ink droplets to bleed into each other before full curing single pass digital printing of narrow web labels.

Solution: A UV pinning system that uses high power UV light emitting diodes (LEDs) installed next to the inkjet array (print head). The UV light from the pinning system, typically lower than that of the full cure UV system, causes the UV ink to thicken, also known as gelling, but not fully cure. This ink thickening stops dot gain and holds the ink droplet pattern in place until it reaches the full cure UV system."

Although the use of UV-LED pinning with UV-curable inkjet fluids is widely known, there is little description in the prior art of the use of UV (e.g. UV-LED) pinning in combination with a final EB-curing process, especially for inkjet compositions that are essentially free of any solvent. When UV pinning followed by EB cure has been discussed, it is terms of reducing the energy of both the UV radiation and EB radiation.

In a particular aspect, the present invention provides a method of printing an energy curable ink or coating composition, comprising:
  a) providing an energy curable ink or coating composition, wherein the energy curable ink or coating composition comprises:
    i) one or more multifunctional polymerizable monomers;
    ii) optionally, one or more polymerizable oligomers and/or monofunctional monomers;
    iii) 0.1% to 5% (w/w) one or more photoinitiators;
    iv) optionally, one or more solvents; and
    v) optionally, one or more colorants;
  b) applying the ink or coating composition of step a) on a substrate;

c) exposing the applied ink or coating composition of step b) to UV radiation to partially cure the ink or coating composition, pinning the ink or coating composition to the substrate; and d) exposing the partially cured ink or coating composition of step c) to electron beam radiation.

There is no restriction on the nature of the light source used to generate the UV radiation, but light sources generating UVA radiation, particularly UV-LED lamps, are preferred. Where UV-LED light sources are used then any combination of lamps may be used with any peak irradiances. Thus, any combination of UV-LED lamps emitting light in the 330 to 410 nm band of the UV spectrum may be used, and include those lamps with peak irradiance emissions of 355, 365, 377, 385, 395 and 405 nm. The only limitation is that the UV-LED lamps deliver a sufficient dose of UV light to effectively pin the inks and/or coatings prior to any subsequent operation, including the final EB-curing process. It should be appreciated that the invention includes those instances where inks are printed onto substrates and pinned and then overprinted with further inks, which themselves may be pinned under the action of UV light prior to the final EB curing step.

Although favourably directed to the pinning via UVA light, it should be understood that the inventive method also encompasses the pinning of inkjet inks and/or coatings with sources emitting UVB and UVC light.

The inventors have found that UV doses of 100 mJ/cm$^2$ and less are sufficient to pin the inks according to the current invention. However, it should be understood that there is no limitation on the UV dose used to pin the inks in the method according to the current invention prior to the final EB curing step. The present method typically uses UV doses of 10 to 200 mJ/cm$^2$. For example, UV doses may be 10 to 190 mJ/cm$^2$; or 10 to 180 mJ/cm$^2$; or 10 to 170 mJ/cm$^2$; or 10 to 160 mJ/cm$^2$; or 10 to 150 mJ/cm$^2$; or 10 to 140 mJ/cm$^2$; or 10 to 130 mJ/cm$^2$; or 10 to 120 mJ/cm$^2$; or 10 to 110 mJ/cm$^2$; or 10 to 100 mJ/cm$^2$; or 10 to 90 mJ/cm$^2$; or 10 to 80 mJ/cm$^2$; or 10 to 70 mJ/cm$^2$; or 10 to 60 mJ/cm$^2$; or 10 to 50 mJ/cm$^2$; or 10 to 40 mJ/cm$^2$; or 10 to 30 mJ/cm$^2$; or 10 to 20 mJ/cm$^2$; or 20 to 200 mJ/cm$^2$; or 20 to 190 mJ/cm$^2$; or 20 to 180 mJ/cm$^2$; or 20 to 170 mJ/cm$^2$; or 20 to 160 mJ/cm$^2$; or 20 to 150 mJ/cm$^2$; or 20 to 140 mJ/cm$^2$; or 20 to 130 mJ/cm$^2$; or 20 to 120 mJ/cm$^2$; or 20 to 110 mJ/cm$^2$; or 20 to 100 mJ/cm$^2$; or 20 to 90 mJ/cm$^2$; or 20 to 80 mJ/cm$^2$; or 20 to 70 mJ/cm$^2$; or 20 to 60 mJ/cm$^2$; or 20 to 50 mJ/cm$^2$; or 20 to 40 mJ/cm$^2$; or 20 to 30 mJ/cm$^2$; or 25 to 200 mJ/cm$^2$; or 25 to 190 mJ/cm$^2$; or 25 to 180 mJ/cm$^2$; or 25 to 170 mJ/cm$^2$; or 25 to 160 mJ/cm$^2$; or 25 to 150 mJ/cm$^2$; or 25 to 140 mJ/cm$^2$; or 25 to 130 mJ/cm$^2$; or 25 to 120 mJ/cm$^2$; or 25 to 110 mJ/cm$^2$; or 25 to 100 mJ/cm$^2$; or 25 to 90 mJ/cm$^2$; or 25 to 80 mJ/cm$^2$; or 25 to 70 mJ/cm$^2$; or 25 to 60 mJ/cm$^2$; or 25 to 50 mJ/cm$^2$; or 25 to 40 mJ/cm$^2$; or 25 to 30 mJ/cm$^2$.

There is no restriction on the EB dose that is used to cure the compositions of the current invention other than the proviso that for the printing of food packaging and other sensitive applications that sufficient EB dose is used to achieve sufficient cure of the monomers of the inks such that the migration risk associated with the contamination of foodstuffs with these monomers is sufficiently minimized so as to attain the required levels. It is preferable that EB doses of 20 kGy and greater, and more preferably 30 kGy and greater are used, with accelerating voltages in the range 70-200 keV.

There is no limitation on the EB dose of the method used to cure the inkjet inks and coatings. However, where the inks and/or coatings are intended for the printing of food packaging and other sensitive applications it is preferred that the EB dose applied to the printed inks and/or coatings should be at least 20 kGy and more preferably 30 kGy, or greater. The EB dose typically used in the method of the present invention is between 20 kGy and 200 kGy. For example, the EB dose may be greater than or equal to 20 kGy; or greater than or equal to 30 kGy; or greater than or equal to 40 kGy; or greater than or equal to 50 kGy; or greater than or equal to 60 kGy; or greater than or equal to 70 kGy; or greater than or equal to 80 kGy; or greater than or equal to 90 kGy; or greater than or equal to 100 kGy; or greater than or equal to 110 kGy; or greater than or equal to 120 kGy; or greater than or equal to 130 kGy; or greater than or equal to 140 kGy; or greater than or equal to 150 kGy. For example, the EB dose may be between 30 to 200 kGy; or between 40 to 200 kGy; or between 50 to 200 kGy; or between 60 to 200 kGy; or between 70 to 200 kGy; or between 80 to 200 kGy; or between 90 to 200 kGy; or between 100 to 200 kGy; or between 110 to 200 kGy; or between 120 to 200 kGy; or between 130 to 200 kGy; or between 140 to 200 kGy; or between 150 to 200 kGy; or between 160 to 200 kGy; or between 170 to 200 kGy; or between 180 to 200 kGy; or between 190 to 200 kGy. For example, the EB dose may be between 20 to 150 kGy; or between 20 to 140 kGy; or between 20 to 130 kGy; or between 20 to 120 kGy; or between 20 to 110 kGy; or between 20 to 100 kGy; or between 20 to 90 kGy; or between 20 to 80 kGy; or between 20 to 70 kGy; or between 20 to 60 kGy; or between 20 to 50 kGy; or between 20 to 40 kGy; or between 20 to 30 kGy.

Again, there is no limitation on the accelerating voltage used to generate the EB radiation, but it is preferred that the accelerating voltage should be 70 keV or greater and more preferably 80 keV or greater. Typically, the accelerating voltage used to generate the EB radiation is between 70 keV and 200 keV. For example, the accelerating voltage may be between 80 and 200 keV; or between 90 and 200 keV; or between 100 and 200 keV; or between 110 and 200 keV; or between 120 and 200 keV; or between 130 and 200 keV; or between 140 and 200 keV; or between 150 and 200 keV; or between 160 and 200 keV; or between 170 and 200 keV; or between 180 and 200 keV; or between 190 and 200 keV. For example, the accelerating may be between 70 and 150 keV; or between 70 and 140 keV; or between 70 and 130 keV; or between 70 and 120 keV; or between 70 and 110 keV; or between 70 and 100 keV; or between 70 and 90 keV; or between 70 and 80 keV.

There is no limitation on either the UV light source, or the dose required to pin the inks. The inventors have found that UV doses of 100 mJ/cm$^2$, or less are sufficient to pin the inks according to the inventive method. In the case of pinning the inks with a UV-LED source, the inventors found that inks could be effectively pinned with doses as low as 25 mJ/cm$^2$ using a 12 W/cm Phoseon Firejet 200 UV-LED (395 nm) lamp.

After pinning by UV light, the formulated compositions of the current method can be cured by electron beam cure using an acceleration voltage of greater than or equal to 70 keV, a dose of greater than or equal to 20 kGy, and nitrogen inertion giving an oxygen level of less than or equal to 1000 ppm, and preferably less than or equal to 200 ppm. However, there is no limitation on the EB dose supplied in the inventive method to cure the compositions of the invention. The only proviso is that for the printing of food packaging and the printing of other articles requiring low migration that sufficient dose is used to deliver the required low levels of migratable monomer, preferably of less than 50 ppb contamination, and more preferably of less than 10 ppb contamination. The inventors have found that EB doses of 30 kGy and greater are preferred to achieve very low levels of unbound monomer. Where EB doses of 30 kGy and greater are used the resultant cured coatings will have improved adhesion on plastic substrates such as polyester, polycarbonate, PVC, acrylic, polypropylene, polystyrene, HDPE, LDPE and aluminum composite materials, which is a significant advantage.

The inventors have surprisingly found that when inks and/or coatings are cured with EB radiation according to the method of the present invention that higher doses, of 30 kGy or greater, can result in an improvement in adhesion to plastic substrates, more so than might be achieved with equivalent inks and/or coatings comprising adequate blends of photoinitiator and cured solely by UV light. This is a surprising finding and is a further aspect of the invention that for the printing of plastic substrates according to the inventive method that EB doses of 30 kGy, or greater, are advantageous. This is a key finding, especially for those inkjet inks and coatings that comprise large amounts of multifunctional monomers. It is widely held state-of-the-art that inkjet inks and fluids requiring adhesion to plastic substrates should commonly comprise significant concentrations of low molecular weight monofunctional monomers. It is understood that such low molecular weight monofunctional monomers promote adhesion by solvating the surface of the plastic film to which the ink and/or coatings are printed onto, and also by increasing the flexibility and relaxation of cured ink films, compared with those inks comprising largely of multifunctional monomers. Clearly, this surprising finding is advantageous for the printing of multifunctional inks onto plastic substrates. The inventors do not wish to be bound to any particular theory as to why this is the case, but postulate that a potential reason for the improved adhesion performance is due to reactive grafting between the plastic substrate and ink. It is envisaged that under the influence of EB doses specified by the current invention, free radicals are created at the substrate surface which can then act as initiating sites for polymerisation of the monomers contained within the ink. Thus, the ink would become covalently bound to the plastic substrate, resulting in improved adhesion of the ink to the plastic surface.

The inventors' finding that multifunctional inkjet fluids can be cured under the action of electron beam with doses of greater than or equal to 30 kGy and deliver excellent adhesion to various plastic surfaces has not been described in any of the identified prior art.

The most likely application for the process and compositions of the current invention is in the single pass inkjet printing of plastic films, such as narrow web printing of labels and flexible packaging. Where food packaging is to be printed, it is preferred that the concentration of any blend of monofunctional monomer should be less than 10% (w/w), and preferably less than 5%. As a further aspect of the invention, photoinitiators may be included in the ink to enable the UV-pinning of the inks prior to EB-curing.

It should be understood that photoinitiators form an essential part of compositions of the current invention, even though they are not required as part of the EB initiation process. However, they are required for 'pinning' the inks shortly after they have been printed and prior to further processes such as the printing of further inks and coatings prior to the EB-curing stage. The inventive method incorporates any number of individual printing and pinning processes prior to the final EB-curing stage. For example, a white ink may be printed and pinned, followed by the printing of cyan, magenta, yellow, black and spot colour inks prior to the EB-curing stage. As a further example, taking the preceding example, there may also be pinning stages between the colors after the printing and pinning of the initially printed white ink.

'Pinning' is a recognized term in the industry and refers to any process where an inkjet print after deposition from the printhead is subjected to a process that increases the viscosity of the ink sufficiently to prevent its spreading (dot gain), and to improve the holdout of inks overprinted onto it to mitigate against ink bleed. Without pinning, a loss of print quality can ensue from the processes of excessive dot gain and ink bleed. An appropriate means of pinning an inkjet ink or coating prior to the final EB-curing stage is to partially cure the ink via a UV-pinning process. To enable this it is preferable that low concentrations of any blend of photoinitiators be included in any composition according to the current invention. There is no limit on the concentration of the photoinitiator component of compositions of the current invention. However, as photoinitiators are known to attenuate electron beam curing, it is preferred that the total concentration of photoinitiators is below 5% (w/w) of the total composition, preferably less than 3% (w/w) and more preferably less than 2% (w/w). A particularly preferred photoinitiator class for the UV-pinning of inks and coatings of the current invention are the acylphosphine oxide type. However, any combination of photoinitiators is covered by the inventive method.

When ink and coating compositions of the current invention are pinned under the action of UV-light, any UV-light source producing an actinic effect can be used. Typically, the UV radiation has a wavelength between 250 nm to 450 nm. For example, the UV radiation may have a wavelength between 300 nm and 420 nm. A list of potential UV light sources includes, but is not limited to, medium pressure mercury lamps, low pressure mercury lamps, UV-LED, UVC lamps, xenon lamps, daylight. However, as previously mentioned UV-LED light sources are preferred.

Where the inks are to be printed onto substrates which will subsequently form part of food packaging, pharmaceutical packaging or other sensitive applications, it is preferred that those photoinitiators having recognized low migration potential be used. Low migration photoinitiators include polymeric, polymerizable and multifunctional types. The fact that only low concentrations of photoinitiators are required in the inks used in the inventive method is clearly advantageous for those applications requiring low migration, such as the printing of food packaging. Photoinitiators and residues thereof can pose a significant risk to the unwanted contamination of sensitive produce, such as foods, drugs, etc.

Where the inks of the current invention are to be used in the printing of food packaging and other sensitive applications, the inventors have found that highly alkoxylated, for example, ethoxylated monomers as revealed in WO 2015/148094 are particularly effective in achieving high degrees of monomer conversion and are therefore incorporated as an aspect of the current invention. In the present invention, the alkoxylated monomers preferably have a degree of alkoxylation of greater than or equal to 2. WO 2015/148094 claimed inks comprising hydroxyl-ketone type photoinitiators as part of the composition. The inventors have found that such photoinitiators have poor pinning performance, especially under the action of a UV-LED light source, whereas photoinitiators such as acyl phosphine oxide type photoinitiators and thioxanthone type photoinitiators are effective in pinning inks of the current invention, at concentrations of less than 2.0%.

An aspect of the current invention is a limitation on the amount of photoinitiator that is incorporated into any EB-curable inkjet composition. The inventors have found that it is preferable to limit the total PI concentration to less than 5% (w/w) of the total ink composition, and it is more preferable to limit the photoinitiator concentration to 2% (w/w) or less of the composition. The energy curable ink or coating compositions of the present invention typically comprise 0.1% to 5% (w/w) one or more photoinitiators, based on the total weight of the composition. For example, the energy curable ink or coating compositions may comprise one or more photoinitiators in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

An advantage of compositions applied according to the current inventive method, exposed in the first instance by the light from a UV-LED lamp followed by a final EB-curing process, is that the amount of photoinitiator can be substantially less than would be used in a solely UV-curable inkjet composition. This has significant benefit in terms of compositions being able to deliver low odor and low migratables after the final EB-curing process. For conventional UV-curable inkjet compositions it is usual that they comprise greater than 5.0% (w/w) of photoinitiator to deliver the desired level of cure after exposure to UV light. The inventors have found that 2.0% or less of photoinitiator, and certainly less than 5.0%, is sufficient to achieve acceptable pinning of inkjet fluids prior to the EB-curing step. Furthermore, the inventors have found, in a further aspect, that it is desirable to limit the amount of photoinitiator present in an inkjet composition as high concentrations of photoinitiators can have a deleterious effect on the effectiveness of the EB-curing process, in that the conversion of monomer decreases with increasing photoinitiator concentrations. This is an important consideration when it comes to the inkjet printing of materials intended for food packaging, pharmaceutical packaging, personal care packaging and other sensitive applications. It is also useful to limit the amount of photoinitiator content of the inventive compositions as this reduces the risk of photoinitiator fragments migrating from the cured ink and causing unwanted contamination of any packaged goods, especially of foodstuffs.

It is preferable that the photoinitiators used are those that are able to initiate UV-cure encompassing UVA light (315-400 nm), although photoinitiators active with UV light outside this range are also covered by the invention. Any UV light source which produces light in the UVA band is suitable, but especially preferred are UV-LED lamps. Preferred photoinitiator types that may be used include acyl phosphine oxide, thioxanthone and aminoketone type photoinitiators. Where the inks are to be printed onto food packaging and other sensitive applications, such as pharmaceutical packaging or personal care packaging, it is highly preferred that the photoinitiators used are those that are recognised as suitable for such applications. Such photoinitiators are those suitable for low migration printing inks and are those preferably present in Groups 1 and 1B of the EuPIA Suitability List of Photo-initiators for Low Migration UV Printing Inks and Varnishes. Especially preferred photoinitiators of the acylphosphine oxide type include bis(2,4,6-trimethylbenzoyl)-phenylphosphineoxide and ethyl-2,4,6-trimethylbenzoylphenylphosphinate. Preferred photoinitiators of the thioxanthone class are polymeric and polymerisable types including, but not restricted to, Omnipol TX (ex. IGM), Genopol TX and Genopol TX-2 (ex. Rahn) and polymerisable types such as Omnipol TX-3 (ex. IGM). Preferred photoinitiators of the aminoketone type include but are not limited to, polymeric types such as Omnipol 910 and Omnipol 9210.

As well as the aforementioned photoinitiators, others which may also be used in the UV-LED pinning of the inks prior to EB-cure include oxime esters, such as Irgacure OXE01 and OXE02 (ex. IGM). Another class of photoinitiators that has the capacity to pin inks of the current invention under the action of the output from UV-LED lamps are 3-ketocoumarins, such as revealed in WO 2014/063997. It should be appreciated by those skilled in the art that any photoinitiator having the ability to initiate photopolymerisation in the UVA wavelengths and especially in the wavelength range 320 to 410 nm may be used in compositions according to the current invention that are pinnable under the action of UV-LED lamps. Any combination of UV-LED lamps may be used and include, but are not limited to, those with peak irradiances at 355, 365, 377, 385, 395 and 405 nm. The only limitation is that there is sufficient intensity of radiation with the compositions of the current invention to effectively pin the ink after printing to ensure print quality prior to the EB-curing stage.

Suitable types of photoinitiators include, but are not limited to α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chloro-thioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyl-diphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxy-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(n 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist may also be included in the formulation. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 all available from DSM-AGI. When present, amine synergists are typically present in an amount of 0.1% to 5% (w/w), based on the total weight of the composition. For example, the energy curable ink or coating compositions may comprise one or more amine synergists in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Particularly preferred amine synergists are aminoacrylates formed by the Michael reaction of polymerizable acrylated monomers or oligomers, with alkanolamines, as revealed by WO 2016/186838 and included herein. The inventors have found that the EB-cure of inventive compositions is enhanced when the concentration of such aminoacrylates is greater than 2.5% and preferably 5.0% or greater. However, it should be understood that there is no restriction on the concentration of such aminoacrylates in compositions of the invention.

Polymeric photoinitiators and sensitizers are also suitable, including, for example, polymeric aminobenzoates (GE-NOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

Where the inks of the current invention are used in the printing of food packaging, pharmaceutical packaging, and other sensitive applications, it is preferred that the photoinitiators used in the preparation of the inks have a low migration potential. Thus, any blend of polymeric, polymerizable and multifunctional types may be used. A particularly preferred photoinitiator is the acylphosphine oxide type, and especially bis(2,4,6-trimethylbenzoyl)-phenylphosphineoxide. This photoinitiator is recognized as suitable for use in low migration applications and the inventors have found it to be effective at concentrations of less than 1.0% in the UV-LED pinning of inks of the current invention.

Other photoinitiators which are effective in enabling pinning under the action of the UVA light generated by UV-LED lamps include thioxanthones, aminoketones, keto-coumarins and oxime esters. Polymerisable, multifunctional and polymeric derivatives of these types of photoinitiator are preferred when the inks of the method are applied to food packaging, pharmaceutical packaging, personal care packaging, or other sensitive applications requiring low levels of migration from the cured inks of the invention, which might otherwise result in unwanted contamination of the surrounding environment.

It should be understood that there is no restriction on the type of photoinitiator used other than that the absorption of the photoinitiator matches the spectral output of the UV source used to pin the inks. Thus, the invention also covers the use of UV sources that emit at shorter wavelengths than UVA. Thus, the invention also covers pinning by UVB and UVC light. Those skilled in the art will appreciate that to effect pinning of the inks or coatings of the inventive method with UVB and UVC UV light that the correct choice of photoinitiators would necessarily be made.

Monomers play a major role in determining the physical properties of a radiation curable inkjet formulation and the resulting film. Regardless of their chemical structure, they always require at least one polymerizable group. In the case of curing by a free-radical polymerization mechanism, which can be initiated by electron beam ionization radiation or via radical-generating photoinitiators, the polymerizable groups are in general carbon-carbon double bonds. The most important radically curable monomers used in inkjet inks contain acrylate or, less frequently, methacrylate groups. Other polymerisable groups include vinyl ethers, propenyl ethers, ally ethers and acrylamides. The invention includes monomers and oligomers which comprise any combination of the afore-mentioned polymerisable groups. The monomers are usually derived from monoalcohols, diols, or polyols that are sometimes alkoxylated, which are usually esterified with either acrylic or methacrylic acid. The functionality, i.e., the number of polymerizable groups per molecule, is of major importance to the final performance of the inkjet ink. Formulations containing monomers with one polymerizable group will produce a linear polymer structure while those with two or more polymerizable groups will give rise to crosslinked polymer structures. As the crosslink density increases, so will the hardness, and chemical and scratch resistance, but a resultant loss of adhesion often occurs. The crosslink density depends upon the average number of polymerizable groups per molecule of the monomer (i.e. the functionality) and the molecular weight between two crosslinks. The functionality normally lies between one and six for acrylate monomers with either one or two polymerizable groups being preferred for the formulation of free radically cured inkjet inks.

Examples of suitable monofunctional and multifunctional ethylenically unsaturated monomers include, but are not limited to, those listed below, and combinations thereof, where the terms ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Preferably, the alkoxylated monomers have a degree of alkoxylation of greater than or equal to 2. Equivalent methacrylate compounds are also capable of being used, although those skilled in the art will appreciate that methacrylate compounds have lower reactivity than their equivalent acrylate counterparts.

Suitable monofunctional ethylenically unsaturated monomers include, but are not limited to: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl-1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; and combinations thereof.

When intended for applications requiring low levels of uncured, migratable monomers in the printed and cured ink or coating, such as the printing of food packaging, the ink and coating compositions of the present invention typically comprise about 0.1% to 10% (w/w) monofunctional monomers, based on the total weight of the composition. For example, the energy curable ink or coating compositions may comprise one or more monofunctional monomers in an amount of about 0.1% to 9.5%; or about 0.1% to 9%; or about 0.1% to 8.5%; or about 0.1% to 8%; or about 0.1% to 7.5%; or about 0.1% to 7%; or about 01% to 6.5%; or about 0.1% to 6%; or about 0.1% to 5.5%; or about 0.1% to 5%; or about 0.1% to 4.5%; or about 0.1% to 4%; or about 0.1% to 3.5%; or about 0.1% to 3%; or about 0.1% to 2.5%; or about 0.1% to 2%; or about 0.1% to 1.5%; or about 0.1% to 1%; or about 0.1% to 0.5%; or about 0.5% to 10%; or about 0.5% to 9.5% or about 0.5% to 9%; or about 0.5% to 8.5%; or about 0.5% to 8%; or about 0.5% to 7.5%; or about 0.5% to 7%; or about 0.5% to 6.5%; or about 0.5% to 6%; or about 0.5% to 5.5%; or about 0.5% to 5%; or about 0.5% to 4.5%; or about 0.5% to 4%; or about 0.5% to 3.5%; or about 0.5% to 3%; or about 0.5% to 2.5%; or about 0.5% to 2%; or about 0.5% to 1.5%; or about 0.5% to 1%; or about 1% to 10%; or about 1% to 9.5%; or about 1% to 9%; or about 1% to 8.5%; or about 1% to 8%; or about 1% to 7.5%; or about 1% to 7%; or about 1% to 6.5%; or about 1% to 6%; or about 1% to 5.5%; or about 1% to 5%; or about 1% to 4.5%; or about 1% to 4%; or about 1% to 3.5%; or about 1% to 3%; or about 1% to 2.5%; or about 1% to 2%; or about 1% to 1.5%; or about 2% to 10%; or about 2% to 9.5%; or about 2% to 9%; or about 2% to 8.5%; or about 2% to 8%; or about 2% to 7.5%; or about 2% to 7%; or about 2% to 6.5%; or about 2% to 6%; or about 2% to 5.5%; or about 2% to 5%; or about 2% to 4.5%; or about 2% to 4%; or about 2% to 3.5%; or about 2% to 3%; or about 2% to 2.5%.

When intended for applications where low migration and potential contamination of the surrounding environment is not a concern, then the ink and coating compositions can contain any amount of monofunctional monomers suitable for the particular application. For example, when lower viscosity is preferred, then monofunctional monomers may be present in an amount of greater than 10% (w/w).

Suitable multifunctional ethylenically unsaturated monomers include, but are not limited to: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis [oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate; and combinations thereof.

Examples of monomers comprising free radically polymerizable groups other than acrylate include N-vinyl amides, vinyl ethers and vinyl esters. Examples of N-vinyl amides include, but are not limited to, N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide (VIMA) or acryloyl morpholine (ACMO), and combinations thereof. Examples of vinyl ethers and vinyl esters include, but are not limited to; 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether; isobutyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1-4, cyclohexanedimethanol divinyl ether (CHDM-di); hydroxybutyl vinylether (HBVE); 1-4-cyclohexanedimethanol monovinyl ether (CHDM-mono); 1,2,4-trivinylcyclohexane (TVCH); vinylphosphonic acid dimethylester (VPA); or vinylphosphonic acid dimethyl ester (VPADME); and combinations thereof.

As described earlier, the invention also includes the use of monomers and oligomers which comprise two or more different polymerisable groups as part of their chemical structure, otherwise known as hybrid monomers. Thus, the use of those monomers revealed in U.S. Pat. Nos. 6,767,980 and 6,310,115 are herein covered by the current invention. Specific examples of hybrid monomers include 2-(2-vinyloxyethoxy)ethyl acrylate ('VEEA', ex. Nippon Shokubai) and 2-(2-vinyloxyethoxy)ethyl methacrylate ('VEEM', ex. Nippon Shokubai).

The ink and coating compositions of the present invention typically comprise about 10% to 95% (w/w) one or more multifunctional monomers, based on the total weight of the composition. For example, the energy curable ink or coating compositions may comprise one or more multifunctional monomers in an amount of about 10% to 90%; or about 10% to 85%; or about 10% to 80%; or about 10% to about 75%; or about 10% to 70%; or about 10% to 65%; or about 10% to 60%; or about 10% to 55%; or about 10% to 50%; or about 10% to 45%; or about 10% to 40%; or about 10% to 35%; or about 10% to 30%; or about 10% to 25%; or about 10% to 20%; or about 10% to 15%; or about 15% to 95%; or about 15% to 90%; or about 15% to 85%; or about 15% to 80%; or about 15% to 75%; or about 15% to 70%; or about 15% to 65%; or about 15% to 60%; or about 15% to 55%; or about 15% to 50%; or about 15% to 45%; or about 15% to 40%; or about 15% to 35%; or about 15% to 30%; or about 15% to 25%; or about 15% to 20%; or about 20% to 95%; or about 20% to 90%; or about 20% to 85%; or about 20% to 80%; or about 20% to 75%; or about 20% to 70%; or about 20% to 65%; or about 20% to 60%; or about 20% to 55%; or about 20% to 50%; or about 20% to 45%; or about 20% to 40%; or about 20% to 35%; or about 20% to 30%; or about 20% to 25%. In one embodiment, essentially all of the polymerizable monomers in the ink or coating composition are multifunctional monomers.

The ink and coating compositions of the present invention may optionally contain one or more solvents. Solvents include, but are not limited to, water, hydrocarbons, ethers, esters, and ketones. When present, the solvents are included in an amount of less than 5% (w/w), based on the total weight of the ink or coating composition. For example, the solvents may be present in an amount of about 0.1% to 5% (w/w); or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The addition of passive (inert) resins can also be advantageous as these can be used to control the porosity of the coating. Typically, acrylic based passive resins are preferred. When present, passive resins are typically present in an amount of 1% to 15% (w/w), based on the total weight of the ink or coating composition. For example, the passive resins may be present in an amount of about 1% to about 10%; or about 1% to about 5%; or about 1% to about 3%.

A stabilizer may also be used in the composition to ensure good pot life of the ink, examples of which are nitroxy based stabilizers such as OHTEMPO, TEMPO, and Irgastab UV10. Phenolic stabilizers such as hydroquinone (HQ), methyletherhydroquinone (MEHQ), butylhydroxytoluene (BHT) and 2,6-di-tert-butyl-N,N-dimethylamino-p-cresol. Nitrosophenylhydroxylamine (NPHA) base inhibitors NPHA, amine salts, and metal salts (Al salt, N-PAL) plus the aromatic amine inhibitors diphenylamine (DPA) and phenylenediamine (PPD) are also suitable. Other suitable stabilizers are florstab UV-1, UV-8, Genorad 16 and 18. When present, the ink and coating compositions of the present invention typically comprise about 0.1% to 5% (w/w) one or more stabilizers, based on the total weight of the composition. For example, the energy curable ink or coating compositions may comprise one or more stabilizers in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Included in the ink formulation can be a suitable de-aerator, which will prevent the formation of air inclusions and pinholes in the cured coating. These also reduce rectified diffusion which can cause reliability issues in the printhead. The following products are available from EVONIK: TEGO AIREX 900, 910, 916, 920, 931, 936, 940, 944, 945, 950, 962, 980, and 986. When present, the ink and coating compositions of the present invention typically comprise about 0.1% to 5% (w/w) one or more de-aerators, based on the total weight of the composition. For example, the energy curable ink or coating compositions may comprise one or more de-aerators in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Defoamers can also be included in the formulation, these prevent the formation of foam during manufacture of the ink and also while jetting. These are particularly important with recirculating printheads. Suitable defoamers include TEGO FOAMEX N, FOAMEX 1488, 1495, 3062, 7447, 800, 8030, 805, 8050, 810, 815N, 822, 825, 830,831, 835, 840, 842, 843, 845, 855, 860, and 883, TEGO FOAMEX K3, TEGO FOAMEX K7/K8 and TEGO TWIN 4000 available from EVONIK. Available from BYK are BYK-066N, 088, 055, 057, 1790, 020, BYK-A 530, 067A, and BYK 354. When present, the ink and coating compositions of the present invention typically comprise about 0.1% to 5% (w/w) one or more defoamers, based on the total weight of the composition. For example, the energy curable ink or coating compositions may comprise one or more defoamers in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Surface control additives are often used to control the surface tension of the ink, which is required to adjust the wetting on the face plate of the printhead and also to give the desired drop spread on the substrate or, and in the case of multi pass inkjet printing, wet on dry drop spread. They can also be used to control the level of slip and scratch resistance of the coating. Suitable surface control additives include but are not limited to TEGO FLOW300, 370, and 425, TEGO GLIDE 100, 110, 130, 406, 410, 411, 415, 420, 432, 435, 440, 482, A115, and B1484, TEGO GLIDE ZG 400, TEGO RAD2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from EVONIK. Available from BYK are BYK 333 and 337, BYK UV3500, BYK 378, 347, and 361, BYK UV3530 and 3570, CERAFLOUR 998 and 996, NANOBYK 3601, 3610, and 3650 and CERMAT 258. From CYTEC, EBECRYL 350 and 1360, MODAFLOW 9200, and EBECRYL 341. From SARTOMER the aliphatic silicone acrylate CN9800 may be used. When present, the ink and coating compositions of the present invention typically comprise about 0.1% to 5% (w/w) one or more surface control additives, based on the total weight of the composition. For example, the energy curable ink or coating compositions may comprise one or more surface control additives in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The inks and coatings of the present invention may also contain one or more aliphatic silicone acrylates, such as silicone polyether acrylates. When present, the aliphatic silicone acrylates are typically present in an amount of 0% to 5% (w/w), based on the total weight of the composition. For example, the aliphatic silicone acrylates may be present in an amount of about 0.1% to about 5%; or about 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The ink compositions of the present invention may optionally contain one or more colorants, including pigments and/or dyes. Examples of suitable organic or inorganic pigments include, but are not limited to, carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include, but are not limited to, azo dyes, anthraquinone dyes, xanthene dyes, azine dyes, combinations thereof and the like.

Commercial organic pigments classified according to Color Index International according to the following trade designations, blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109,PY110, PY113, PY128, PY129,PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments.

The pigments are milled to typically less than 1 micrometer after milling with a preferred particle size distribution of 10-500 nm, more preferably 10-350 nm to have better transparency and a wide color gamut. The pigment dispersion will typically contain 60-90% monomer which can be a mono or multifunctional (meth)acrylate monomer, with added stabilizer, inhibitor, dispersant and optionally a pigment additive/synergist and/or a wetting additive/oligomer/resin. The ratio of pigment to dispersant would usually be between 1:2 to 9:1 depending on the chemistry of the pigment and dispersant. Examples of typical dispersants would include EFKA 7414, 7476, 7477, 7700, 7701, 7702, 7710, 7731 and 7732 available from BASF and SOLSPERSE 1700, 1900, 24000SC/GR, 26000, 32000, 33000, 35000, 36000, 39000, 41000 and 71000 available from LUBRIZOL. Examples of additive/synergists to aid dispersion stability include SOLSPERSE 5000, 12000 and 22000 from LUBRIZOL.

When present, organic pigments and dyes are typically present in an amount of about 0.1% to about 7% (w/w), based on the total weight of the composition. For example, the organic pigments and dyes may be present in an amount of 0.1% to 6.5%; or 0.1% to 6%; or 0.1% to 5.5%; or 0.1% to 5%; or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 7%; or 0.5% to 6.5%; or 0.5% to 6%; or 0.5% to 5.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%; or 1% to 7%; or 1% to 6.5%; or 1% to 6%; or 1% to 5.5%; or 1% to 5%; or 1% to 4.5%; or 1% to 4%; or 1% to 3.5%; or 1% to 3%; or 1% to 2.5%; or 1% to 2%; or 1% to 1.5%.

When present, inorganic pigments are typically present in an amount of 1% to 40% (w/w), based on the total weight of the composition. For example, the inorganic pigments may be present in an amount of 1% to 35%; or 1% to 30%; or 1% to 25%; or 1% to 20%; or 1% to 15%; or 5% to 40%; or 5% to 35%; or 5% to 30%; or 5% to 25%; or 5% to 20%; or 5% to 15%; or 10% to 35%; or 10% to 30%; or 10% to 25%; or 10% to 20%; or 10% to 15%; or 15% to 40%; or 15% to 35%; or 15% to 30%; or 15% to 25%; or 15% to 20%; or 20% to 40%; or 20% to 35%; or 20% to 30%; or 20% to 25%.

Low migration UV-curable inkjet products are commercially available from a number of inkjet manufacturers, including Agfa, Sun Chemical and SPG Prints. Although these products can achieve the required low migration in certain applications, there can be limitations in their use with existing inkjet press architectures. In particular, where thick ink sections are printed, including the printing of a firstdown white followed by the overprinting of complex colour designs, then, due to the attenuation of the incident UV light by the components of the inks, especially the pigments and photoinitiators, insufficient UV light may reach the lower levels of the ink print to achieve adequate cure of the ink. This is deemed to be especially problematic for the printing of food packaging material requiring the deposition of high inkjet film thicknesses. For example, in the hypothetical case where 8-10 microns of a white inkjet ink comprising 25% (w/w) of titanium dioxide pigment (with UV-LED pinning) is then overprinted with 8-20 microns of a colour design which may include black areas then the amount of incident UV light reaching the lower levels of the underlying white ink can be insufficient to deliver the required full cure for low migration applications.

An advantage of EB cure, and demonstrated by the inventors, is that it is highly penetrating and well able to cure inkjet ink films of at least up to 30 microns, and deliver very low levels of migratable species. Thus, a further aspect of the invention is for a process involving the EB cure of inkjet ink compositions where the total ink film thickness is greater than 12 microns, and more preferably greater than 16 microns.

For applications requiring low migration from the final EB-cured ink film it is preferable that the compositions applied according to the inventive method comprise less than 10% (w/w) of any monofunctional monomer and preferably less than 5.0% (w/w). Due to the low viscosity requirement of inkjet fluids the amount of higher molecular weight multifunctional monomers and polymers should be limited. It is therefore preferable that less than 40%, and preferably less than 30% (w/w) of the total polymerisable component of the inventive compositions should comprise those monomers, oligomers and polymers having molecular weights greater than 1000 amu, and preferably no greater than 500 amu. A further aspect of the invention is that the polymerisable component of the inventive examples should comprise greater than 30%, and more preferably greater than 40% (w/w) of any blend of difunctional monomers having molecular weights of less than 350 amu.

When energy curable ink and coating compositions are applied to the non-contact surface of primary or secondary packaging intended for foodstuffs according to the methods of the present invention (i.e. pinned via the action of UV light, especially UVA light, and finally cured under the action of EB radiation), then any contamination from the package impacting the foodstuff should fall within the guidelines set out by Article 3 of Regulation (EC) No 1935/2004, as recommended by EUPIA, requiring that materials and articles in contact with food;

"shall be manufactured in accordance with good manufacturing practices, so that under normal or foreseeable conditions of use, they do not transfer their constituents to food in quantities which could:
endanger human health; or
bring about an unacceptable change in the composition of the food; or
bring about a deterioration in the organoleptic characteristics thereof"

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. Where no specific migration limit (SML) exists for a specific component then the following migration limits apply;

"A target migration limit of no concern for non-evaluated substances of 10 ppb is the ultimate objective, to be consistent with other food contact materials.
In particular, a substance is acceptable if its specific migration does not exceed:
10 ppb, in case of insufficient toxicological data
50 ppb if three negative mutagenicity tests requested by EFSA4 Guidelines are available
above 50 ppb, if supported by favorable toxicological data and/or evaluation done in
accordance with the EFSA Guidelines" (Extract from EuPIA Guideline on Printing Inks applied to the non-food contact surface of food packaging materials and articles, September 2009).

EUPIA also provides guidelines on how to measure the potential level of migratables arising from printed matter. For inks and coatings applied to the non-food contact surface of packaging (i.e. the outer surface), whether that be to the primary packaging or secondary packaging (labels and sleeves), then the most likely route for migratable species from the ink contaminating the foodstuff is by what is known as set-off migration. This is where printed matter is stacked or reeled prior to it being filled with food. Thus, the ink comes into contact with what will be the food-contact surface of the package and migratable components of the ink can diffuse into this surface. When the package is then filled with foodstuff, the contaminants from the ink which have diffused into the contact-surface of the package can then leach into the food, causing a potential contamination issue. Thus, any energy-curable fluid which is applied to either the primary or secondary packaging of foodstuff should not result in contamination of that foodstuff at levels exceeding the limits detailed above.

It is preferred that the inks used in the process of the invention should comprise less than 10% (w/w) of monofunctional monomers, especially in those instances where the inks are intended for the printing of food packaging and other sensitive applications. However, for those instances where the printing is on any material where low migration and potential contamination of the surrounding environment is not a prerequisite then there is no limitation on the amount of monofunctional monomers that may be used in the preparation of the inks and coatings used in the inventive method. It should be understood by those skilled in the art that a significant disadvantage of inks comprising monofunctional monomers is that after cure, significant concentrations of uncured (and therefore unbound) such monomers persist in the ink which may then contaminate the surrounding environment. This is a particular concern for sensitive printing applications, such as the printing of food packaging, pharmaceutical packaging, personal care packaging, etc. For this reason inkjet inks intended for the printing of such applications should consist predominantly of multifunctional monomers in combination with suitable low migration potential photoinitiators.

EXAMPLES

The following examples illustrate specific aspects of the present invention and are not intended to limit the scope thereof in any respect and should not be so construed.

Cross-Hatch Adhesion Test

The cross-hatch adhesion test was conducted in accordance with ISO 2409, "Paints and varnishes—cross-cut test". The following items were used to conduct the cross-hatch adhesion test: test specimen (printed substrate) with the printed and cured ink thereon; adhesive tape approved by ISO 2409 (ISO2409 Adhesive Tape, ex. Elcometer); rubber eraser; timer; and sharp knife.

The test specimen was placed on a flat surface, and an area of the printed (decorative ink layer) surface was selected. A set of 6 parallel lines approximately 20 cm long and 1 mm apart, was scored across the selected area, and deep enough to penetrate beneath the decorative ink layer. Another set of 6 parallel lines, approximately 20 cm long and 1 mm apart, perpendicular to the first set of lines and centered on their center was scored. A 75 cm length of adhesive tape was stuck on the scored area, with one end left unattached to hold on to during removal. The surface of the tape was rubbed gently with the rubber eraser to ensure even contact between the tape and surface of the test specimen. The tape was left for 90 seconds. After 90 seconds, the tape was removed by seizing the free end and pulling the tape back on itself at approximately 180 degrees in a fast, even and continuous movement. The scored area was inspected and performance was recorded according to the ISO 2409 grading scheme:

0=no removal, edges of the cuts are smooth
1=detachment of small flakes of coating at the intersections of the cuts; cross-cut area affected is ≤5%.
2=coating flaked along the edges and/or at the intersections of the cuts; cross-cut area affected is >5%, but ≤15%.
3=coating has flaked along the edges of the cuts partly or wholly in large ribbons, and/or has flaked partly or wholly on different parts of the squares; cross-cut area affected is >15%, but ≤35%.
4=coating has flaked along the edges of the cuts in large ribbons, and/or some squares have detached partly or wholly; cross-cut area affected is >35%, but ≤65%.
5=more than 65% of the grid area was removed.

For the purposes of the present invention, a score of 0, 1, 2, or 3 was considered a pass; a score of 4 or 5 was considered a fail.

Viscosity Measurements

The viscosities of the inks were measured using a Brookfield DV-II+ Pro Viscometer equipped with spindle no. 18, at 100 rpm.

Curing the Inks for Extraction Testing

The inks were applied to 36 μm Melinex S (a polyester film) at 12 μm thickness and then cured at the specified EB dose. A Comet ebeam EBLab was used to cure the inks. This unit has a maximum beam energy of 200 keV with doses up to 450 kGy in a single pass possible. Nitrogen inertion was applied until the oxygen level was less than 200 parts per million (ppm), with the electron accelerating voltage in keV and the dose of electrons in kGy.

UV Pinning

The inks were tested to determine if they were UV pinnable. A 10 μm ink film was applied to polyester film, and then subjected to UV radiation. In one pinning test, the printed inks were passed under a Phoseon Firejet 200 UV-LED lamp (395 nm) so that the applied UV dose was 50 mJ/cm$^2$. In a second pinning test, the inks were exposed to a dose of 50 mJ/cm$^2$ from a medium pressure mercury (H-bulb) lamp. In both tests, the ink was deemed to have been pinned if it was no longer liquid and had cured to a state of high viscosity that resisted rubbing with a cotton wool bud.

Assessing the Level of Extractable Monomer and Photoinitiator Residues

The levels of unbound, unreacted monomer and photoinitiator residues in a cured print were determined by a "total extraction" test. To conduct this test, 30 cm$^2$ of the print was soaked in 2 ml of methanol, containing 0.005% (w/w) of mono methyl ether hydroquinone (MEHQ; stabilizer) for 24 hours at room temperature before the methanol solution was analyzed by GC-MS. The GC-MS was calibrated with known solutions of the monomers and photoinitiator residues and the results reported as parts per billion (ppb), the equivalent amount of monomer that would be present in 1 kg of food according to the EU packaging model (where it is assumed that 600 cm$^2$ of substrate is required to package 1 kg of food) if all of the unbound monomer in the print were to migrate into and contaminate the food. For the purposes of the present invention, the amount of each individual monomer extracted would preferably be less than or equal to 250 ppb, more preferably less than or equal to 100 ppb, more preferably less than or equal to 50 ppb, more preferably less than or equal to 20 ppb, and most preferably less than or equal to 10 ppb.

Preparation of Inks

Inks were prepared by mixing the components according to the formulations in the following examples, using a Silverson mixer.

Example 1

Inks 1 to 6 Comprising Multifunctional Monomers and Having Low Migration Potential Comparative Inks 1 to 5, and inventive Ink 6 were formulated according to the guidelines described in WO 2015/148094 and WO 2016/186838. These inks comprise multifunctional monomers, and are referred to herein as "multifunctional inks." The amount of uncured monomers in EB-cured print films was determined as described above for 12 μm thick ink films applied to the polyester film and cured at the doses stipulated. The ink films were applied to freshly corona discharge treated 36 μm Melinex S, and the adhesion determined at the stated EB doses.

Table 1 provides the formulations for Inks 1 to 6, viscosities as measured at 45° C., and their adhesion to the corona discharge treated polyester film at cure doses of 20, 30, and 40 kGy, with an accelerating voltage of 100 keV. The inks were specifically designed for their low migration potential.

TABLE 1

| Formulations of Inks 1 to 6 | | | | | | |
|---|---|---|---|---|---|---|
| | Ink 1 | Ink 2 | Ink 3 | Ink 4 | Ink 5 | Ink 6 |
| DPGDA | 7.6 | 7.6 | 2.6 | 7.6 | 3.5 | 13.0 |
| VEEA-A1 | 22.0 | 23.0 | 23.0 | 23.0 | 23.0 | 23.0 |
| 3-MePDDA | 30.0 | 30.0 | 30.0 | 30.0 | 30.0 | 30.0 |
| SR9035 | 15.0 | 20.0 | 20.0 | 20.0 | 20.0 | 15.0 |
| LEO10552 | 10.0 | 10.0 | 15.0 | — | 10.0 | — |
| Photomer 4771 | — | — | — | 10.0 | — | 7.0 |
| Irgacure 819 | 0.5 | — | — | — | — | 0.5 |
| Omnipol TX | 1.5 | — | — | — | — | — |
| KIP160 | 2.0 | — | — | — | — | — |
| Esacure 1 | 2.0 | — | — | — | — | — |
| TegoGlide 410 | 0.4 | 0.4 | 0.4 | 0.4 | — | — |
| TegoRad 2300 | — | — | — | — | 4.5 | — |
| TegoRad 2250 | — | — | — | — | — | 2.5 |
| Cyan Dispersion | 9.0 | 9.0 | 9.0 | 9.0 | 9.0 | 9.0 |
| Total | 100.0 | 100.0 | 100.0 | 100.0 | 100.0 | 100.0 |
| Viscosity at 45° C. (mPa · s) | 12.3 | 10.6 | 12.3 | 11.0 | 12.5 | 9.9 |
| Adhesion to Melinex S (20 kGy) | 5 | 5 | 5 | 4 | 4 | 4 |

TABLE 1-continued

Formulations of Inks 1 to 6

|  | Ink 1 | Ink 2 | Ink 3 | Ink 4 | Ink 5 | Ink 6 |
|---|---|---|---|---|---|---|
| Adhesion to Melinex S (30 kGy) | 5 | 5 | 4 | 3 | 3 | 3 |
| Adhesion to Melinex S (40 kGy) | 2 | 1 | 1 | 1 | 0 | 0 |
| Pinnable (UV-LED) | Yes | No | No | No | No | Yes |
| Pinnable (H-Bulb) | Yes | No | No | No | No | Yes |

Notes:
DPGDA = Dipropylene glycol diacrylate
VEEA-A1 = 2-(2-Vinyloxyethoxy)ethyl acrylate, ex. Nippon Shokubai
3-MePDDA = 3-Methylpentanediol diacrylate
SR9035 = Sartomer SR9035, ex. Arkema. Monomer for low migration applications according to WO2015/148094
LEO10552 = Ebecryl LEO10552, ex. Allnex. An aminoacrylate for low migration applications according to WO 2016/186838
Photomer 4771 = An aminoacrylate, ex. IGM Resins, in accordance with U.S. application No. 62,161,933
Irgacure 819, ex. BASF. Bis(2,4,6-trimethylbenzoyl)-phenylphosphineoxide.
Omnipol TX, ex. IGM Resins. A Polymeric thioxanthone photoinitiator.
KIP160 = Esacure KIP160, ex. Lamberti. A difunctional hydroxyl-ketone photoinitiator.
⁴Esacure 1, ex. Lamberti. An oligomeric hydroxyl-ketone photoinitiator.
Tegoglide 410, ex. Evonik, a polyether siloxane copolymer
TegoRad 2300, ex. Evonik, a silicone polyether acrylate.
TegoRad 2250, ex. Evonik, a silicone polyether acrylate.
Cyan Dispersion = a dispersion containing 25.0% (w/w) of Pigment Blue 15:4, the remainder comprising the dispersant (Efka 7476), stabilizers and NPG(PO)DA
NPG(PO)DA = Propoxylated neopentylglycol diacrylate (degree of propoxylation = 2)
For applications where migratables are not critical, Example 1 may be useful.

First, Table 1 shows that, for all the inks, there is an improvement with adhesion as the EB dose is increased from 20 to 30 kGy, and even more so for an EB dose of 40 kGy. It is further apparent from Table 1 that the correct selection of the aminoacrylate and the use of a silicone acrylate can further improve the adhesion performance of these multifunctional inks. A further observation from Table 1 is that an ink designed for curing under the action of UV light, Ink 1, comprising a photoinitiator component according to WO 2014/126720, provides slightly worse adhesion than does an equivalent ink free of any photoinitiator, Ink 2. As expected, the inks comprising silicone polyether acrylate produce a superior adhesion result. This is probably due to the improved release effect that these materials bring to a surface of a cured ink which causes a decrease in the adhesive strength between the adhesive tape and the printed ink surface, and thereby an apparent improvement in adhesion performance.

Another observation from Table 1 is that Ink 6 pins effectively under both the action of the emission from a UV-LED lamp and also when exposed to the emission from a conventional medium pressure mercury lamp (H-bulb).

Table 2 shows the amount of each monomer that could be extracted from 12 μm cured prints of each of the inks described in Table 1, when cured at an EB dose of 40 kGy, and with an accelerating voltage of 100 keV. The amount of each monomer extracted from Ink 6 cured at both 30 and 50 kGy was also determined. The testing was conducted as described above, and the results expressed as ppb.

TABLE 2

Amount of each monomer extracted from Inks 1 to 6

| EB Dose (kGy) | Extractable Monomer (ppb) | Ink 1 | Ink 2 | Ink 3 | Ink 4 | Ink 5 | Ink 6 |
|---|---|---|---|---|---|---|---|
| 30 | PONPGDA |  |  |  |  |  | 18 |
|  | DPGDA |  |  |  |  |  | 135 |
|  | SR341 |  |  |  |  |  | 180 |
|  | VEEA |  |  |  |  |  | 495 |
| 40 | PONPGDA | 1,100 | 21 | 8 | 10 | 7 | 5 |
|  | DPGDA | 650 | 72 | 9 | 26 | 6 | 32 |
|  | SR341 | 760 | 147 | 57 | 46 | 26 | 30 |
|  | VEEA | 1,200 | 70 | 22 | 25 | 16 | 56 |
| 50 | PONPGDA |  |  |  |  |  | <5 |
|  | DPGDA |  |  |  |  |  | 5 |
|  | SR341 |  |  |  |  |  | <5 |
|  | VEEA |  |  |  |  |  | 8 |

Comparing the results for Ink 1 (containing photoinitiators) with Ink 2 (no photoinitiators) in Table 2 shows that photoinitiators have a deleterious impact on the amount of uncured monomer present in a cured ink film after EB-curing. Ideally, no photoinitiator would be included in an ink to be cured only by EB curing, but, for inkjet, as previously discussed, it is preferable to "pin" the inks using UV radiation prior to the final EB curing. Thus, the concentration of photoinitiators should be limited to mitigate against this loss of monomer conversion induced by the presence of photoinitiators.

Comparing the results of Ink 3 with those of Ink 2 shows the benefit of increasing the concentration of the aminoacrylate (LEO10552) in helping to improve the conversion of monomer during EB cure.

Ink 4 compared with Ink 2 shows that selection of aminoacrylates can be beneficial in helping to reduce the level of uncured monomers. Both aminoacrylates used in the preparation of the compositions of Table 1 are preferred types, produced by the Michael addition reaction of multifunctional acrylate monomers with ethalonamine (as the alkalonolamine used for the reaction).

Ink 5 compared with Ink 2 shows the surprising finding that the inclusion of acrylated polyether silicones can increase the conversion of monomers during EB-cure. An aspect of the current invention is to cover inkjet compositions comprising such compounds intended for EB-curing. Ink 6 shows how an ink which is pinnable under the action of both a conventional medium pressure mercury UV-lamp and a UV-LED lamp emitting at 395 nm can be formulated via the inclusion of an acylphosphine oxide photoinitiator and preferred ink components to deliver an ink that produces very low levels of uncured monomer after EB-curing. For Ink 6, not only is improved adhesion achieved at 30 kGy but more so at 40 kGy, as shown in Table 1.

As a further experiment, a 10 μm layer of Ink 6 was applied to polyester film, pinned at 50 mJ/cm², using the UV-LED lamp described above, and then cured with an EB dose of 40 kGy. The amount of uncured monomer, as measured by the extraction test, fell below 5 ppb for all the monomers.

Example 2

Ink 7 with No Photoinitiator and Inks 8 to 15 Comprising Photoinitiators

Inks 7 to 15 were prepared according to the formulations shown in Table 3. Ink 7 did not contain photoinitiator, while Inks 8 to 15 contained low concentrations of photoinitiator so that they could be pinned by irradiation with UV energy before the final EB curing, according to the methods of the present invention. Table 3 also shows the viscosities of the inks, as well as indicating whether they were pinnable under UV-LED radiation or H-bulb radiation.

TABLE 3

Ink 7 without photoinitiator and Inks 8-15 with photoinitiator

|  | Ink 7 | Ink 8 | Ink 9 | Ink 10 | Ink 11 | Ink 12 | Ink 13 | Ink 14 | Ink 15 |
|---|---|---|---|---|---|---|---|---|---|
| DPGDA | 11.0 | 12.5 | 10.5 | 10.0 | 9.5 | 9.0 | 12.5 | 12.5 | 13.0 |
| VEEA-A1 | 23.0 | 23.0 | 23.0 | 23.0 | 23.0 | 23.0 | 23.0 | 23.0 | 23.0 |
| 3-MePDDA | 30.0 | 30.0 | 30.0 | 30.0 | 30.0 | 30.0 | 30.0 | 30.0 | 30.0 |
| SR9035 | 17.5 | 15.0 | 17.5 | 17.5 | 17.5 | 17.5 | 15.0 | 15.0 | 15.0 |
| Photomer 4771 | 7.0 | 7.0 | 7.0 | 7.0 | 7.0 | 7.0 | 7.0 | 7.0 | 7.0 |
| Irgacure 819 | — | — | — | — | — | — | — | — | — |
| Omnipol TX | — | 1.0 | 0.5 | 1.0 | 1.5 | 2.0 | — | — | — |
| Esacure 1 | — | — | — | — | — | — | 1.0 | — | — |
| Omnipol 9210 | — | — | — | — | — | — | — | 1.0 | — |
| Omnirad 4PBZ | — | — | — | — | — | — | — | — | 0.5 |
| TegoRad 2250 | 2.5 | 2.5 | 2.5 | 2.5 | 2.5 | 2.5 | 2.5 | 2.5 | 2.5 |
| Cyan Dispersion | 9.0 | 9.0 | 9.0 | 9.0 | 9.0 | 9.0 | 9.0 | 9.0 | 9.0 |
| Total | 100 | 100 | 100 | 100 | 100 | 100 | 100 | 100 | 100 |
| Viscosity at 45° C. (mPa · s) | 10.1 | 10.0 | 10.7 | 10.8 | 11.0 | 11.2 | 10.0 | 10.1 | 9.9 |
| Pinnable[1] (UV-LED) | No | Yes[1] | Yes[1] | Yes[1] | Yes[1] | Yes[1] | No | Yes[1] | No |
| Pinnable (H-Bulb) | No | Yes | No | Yes | Yes | Yes | Yes | Yes | Yes |

Notes:
Omnipol TX = Polymeric Thioxanthone Photoinitiator, ex. IGM
Esacure 1 = Difunctional alpha-hydroxy ketone photoinitiator, ex. Lamberti
Omnipol 9210 = Polymeric aminoketone photoinitiator, ex. IGM
Omnirad 4PBZ = 4-Phenylbezophenone, ex. IGM
[1]These inks required doses of 100 mJ/cm$^2$ to pin effectively.

The data in Table 3 show that various photoinitiators can be used to pin inks according to the present invention. The inks can be pinned either with the output from a UV-LED lamp or with the output from a conventional medium pressure mercury lamp.

Table 4 provides the results for the extraction testing of 12 μm layers of Inks 7 to 15 applied to polyester and cured at 30, 40, and 50 kGy, at an accelerating voltage of 100 keV.

Table 5 provides the results for the extraction testing of 12 μm layers of the inks applied to polyester and UV-pinned, followed by EB-cure, with a dose of 40 kGy. The inks were pinned at a dose of 50 mJ/cm$^2$. The data in the preceding Tables show that in the case of the inks containing Irgacure 819 (Ink 6), Omnipol TX (Inks 8 to 12), and Omnipol 9210 (Ink 14) the inks were pinned with UV-LED; and in the case of Esacure 1 (Ink 13) and Omnirad 4PBZ (Ink 15) the inks were pinned under the action of a conventional medium pressure (H-bulb) lamp.

TABLE 4

Amount of Monomer Extracted from EB-Cured Prints of Inks 7 to 15

| EB Dose (kGy) | Extractable Monomer (ppb) | Ink 7 | Ink 8 | Ink 9 | Ink 10 | Ink 11 | Ink 12 | Ink 13 | Ink 14 | Ink 15 |
|---|---|---|---|---|---|---|---|---|---|---|
| 30 | PONPGDA | 8 |  | 4 | 11 |  |  |  | <5 |  |
|  | DPGDA | 39 |  | 24 | 115 |  |  |  | 13 |  |
|  | SR341 | 41 |  | 38 | 245 |  |  |  | 14 |  |
|  | VEEA | 49 |  | 115 | 600 |  |  |  | 26 |  |
| 40 | PONPGDA | <5 | 6 | 5 | 4 | 5 | 9 | 26 | 6 | 27 |
|  | DPGDA | <5 | 41 | 14 | 31 | 49 | 34 | 26 | 13 | 165 |
|  | SR341 | <5 | 46 | 12 | 46 | 79 | 79 | 117 | 8 | 215 |
|  | VEEA | <5 | 117 | 14 | 93 | 240 | 295 | 28 | 5 | 510 |
| 50 | PONPGDA | <5 |  | <5 | <5 |  |  |  | <5 |  |
|  | DPGDA | <5 |  | <5 | <5 |  |  |  | <5 |  |
|  | SR341 | <5 |  | <5 | <5 |  |  |  | <5 |  |
|  | VEEA | <5 |  | <5 | <5 |  |  |  | <5 |  |

TABLE 5

Amount of Monomer Extracted from UV-Pinned and EB-Cured Prints of Inks 6, 8, 13, 14 and 15

| EB Dose (kGy) | Extractable Monomer (ppb) | Ink 6 | Ink 8 | Ink 13 | Ink 14 | Ink 15 |
|---|---|---|---|---|---|---|
| 40 | PONPGDA | <5 | <5 | <5 | <5 | <5 |
|  | DPGDA | <5 | <5 | 8 | 8 | 14 |
|  | SR341 | <5 | 6 | 6 | 7 | 13 |
|  | VEEA | <5 | 8 | <5 | <5 | 12 |

The data in Table 4 show that the addition of even low concentrations of photoinitiators can have a negative impact on the amount of unbound monomer after EB cure. However, when the inks are UV-pinned prior to the EB curing stage, the level of uncured monomer decreases significantly (see Table 5).

Table 6 provides the extraction results for Ink 7 applied at thicknesses between 10 and 30 μm to polyester film, and cured at an EB dose of 40 kGy.

TABLE 6

Amount of Monomer Extracted from EB-Cured Prints of Ink 7 at different film weights (40 kGy)

| Extractable Monomer (ppb) | 10 μm | 12 μm | 16 μm | 20 μm | 24 μm | 30 μm |
|---|---|---|---|---|---|---|
| PONPGDA | <5.0 | <5.0 | <5.0 | <5.0 | <5.0 | <5.0 |
| DPGDA | <5.0 | <5.0 | <5.0 | <5.0 | <5.0 | <5.0 |
| 3-MePDDA | <5.0 | <5.0 | <5.0 | <5.0 | <5.0 | <5.0 |
| VEEA | <5.0 | <5.0 | <5.0 | <5.0 | <5.0 | <5.0 |

The data in Table 6 demonstrate the capability of EB-curing to effectively cure through thick ink/coating layers. This is advantageous for inkjet where print designs comprising the printing of a number of different inks over each other are common; for example, print designs where a white ink layer is printed onto a substrate prior to the printing of further inks and/or coatings.

Example 3

Inks 16 and 17—White Inks

White inks were prepared according to the formulations in Table 7. Table 7 includes the viscosities of each ink, and whether they were UV-pinnable under UV radiation.

TABLE 7

Formulations of UV-pinnable white Inks 16 and 17

|  | Ink 16 | Ink 17 |
|---|---|---|
| DPGDA | 8.2 | 8.3 |
| VEEA-A1 | 5.0 | 7.5 |
| 3-MePDDA | 30.0 | 20.0 |
| SR9035 | 15.0 | 15.0 |
| Photomer 4771 | — | 7.0 |
| Irgacure 819 | 0.3 | 0.25 |
| Omnipol TX | — | 0.2 |
| Omnipol 9210 | — | 0.25 |
| TegoRad 2250 | 2.5 | 2.5 |
| White Dispersion[1] | 39.0 | 39.0 |
| Total | 100.0 | 100.0 |

TABLE 7-continued

Formulations of UV-pinnable white Inks 16 and 17

|  | Ink 16 | Ink 17 |
|---|---|---|
| Viscosity at 45° C. (mPa · s) | 8.8 | 11.8 |
| Pinnable (UV-LED) | Yes | Yes |
| Pinnable (H-Bulb) | Yes | Yes |

Notes
[1]The white dispersion comprises 60.0% of titanium dioxide and 1.5% of Solsperse 39000 with the remainder comprising VEEA.

Inks 16 and 17 were applied at a layer thickness of 10 μm, and cured with an EB dose of 40 kGy (accelerating voltage 100 keV), without UV-pinning. Extraction testing, as described above, was conducted on these prints, and the results are shown in Table 8. Ink 16 was also applied at thicknesses of up to 20 μm. The extraction results for varying thicknesses of Ink 16 are also shown in Table 8. In addition to the amount of extracted monomers, Table 8 also shows the amount of mesitaldehyde extracted from the cured white inks.

TABLE 8

Amount of Monomer Extracted from EB-Cured Prints of Inks 16 and 17

| EB Dose (kGy) | Extractable Monomer/ Photoinitiator (ppb) | Ink 16 (10 μm) | Ink 16 (12 μm) | Ink 16 (16 μm) | Ink 16 (20 μm) | Ink 17 (10 μm) |
|---|---|---|---|---|---|---|
| 40 | PONPGDA | <5 | <5 | <5 | <5 | <5 |
|  | DPGDA | <5 | <5 | <5 | <5 | <5 |
|  | SR341 | <5 | <5 | <5 | <5 | <5 |
|  | VEEA | <5 | <5 | <5 | <5 | <5 |
|  | Mesitaldehyde | <5 | <5 | 8 | 12 | <5 |

The results in Table 8 clearly demonstrate that white inks comprising sufficient photoinitiator to pin them under the action of UV light can be effectively cured with electron beam. To demonstrate the inventive method further 10 μm thick layers of Ink 17 were pinned with a dose of 50 mJ/cm² from the afore-mentioned Phoseon UV-LED lamp. To these pinned white ink layers were applied either 10 or 20 μm layers of Ink 7. The combined white and cyan ink prints were then EB cured with a dose of 40 kGy. The cured ink films were then extracted according to the method previously described. In both cases the amounts of unbound monomers and of mesitaldehyde were less than 5 ppb. This further demonstrates the method of the invention and the capacity for electron beam curing to deliver low levels of uncured monomers and of photoinitiator components that might cause contamination of sensitive packaged produce, such as foodstuffs.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method for printing an energy curable ink or coating composition comprising:
    a) providing an energy curable ink or coating composition, wherein the energy curable ink or coating composition comprises:
        i. one or more multifunctional polymerizable monomers;
        ii. one or more polymerizable oligomers and/or monofunctional monomers;

iii. 0.1% to 5% (w/w) one or more photoinitiators;
iv. optionally, one or more solvents, wherein the solvent is present in an amount of 0 wt % (no solvent) to 5 wt %, based on the total weight of the composition; and
v. optionally, one or more colorants;
b) applying the ink or coating composition of step a) on a substrate;
c) exposing the applied ink or coating composition of step b) to UV radiation to partially cure the ink or coating composition, pinning the ink or coating composition to the substrate; and
d) exposing the partially cured ink or coating composition of step c) to electron beam radiation;
wherein the electron beam of step d) is accelerated at an accelerating voltage of equal to or greater than 70 keV and/or wherein the electron beam dose of step d) is equal to or greater than 20 kGy; and wherein the energy curable ink or coating composition comprises at least one monomer having as part of its structure a poly (ethylene oxide) sub-unit where the average degree of ethoxylation is greater than or equal to 2.

2. The method of claim 1, wherein the UV radiation of step b) is UV light having a wavelength from 250 nm to 450 nm.

3. The method of claim 1, wherein the energy curable ink or coating composition comprises greater than 40% (w/w) of any blend of difunctional monomers having a molecular weight of less than 350 amu, based on the total weight of the ink or coating composition.

4. The method of claim 1, wherein the energy curable ink or coating composition comprises less than 30% (w/w) of oligomers or monomers with molecular weights greater than 1000 amu, based on the total weight of the ink or coating composition.

5. The method of claim 1, wherein the energy curable ink or coating composition comprises less than 10% (w/w) of any monofunctional polymerizable monomer or oligomer, based on the total weight of the ink or coating composition.

6. The method of claim 1, wherein the energy curable ink or coating composition further comprises a silicone polyether acrylate.

7. The method of claim 1, wherein the energy curable ink or coating composition is an inkjet ink or coating composition.

8. The method of claim 1, wherein the energy curable ink or coating composition comprises a white pigment, and is a white ink or coating composition.

9. The method of claim 1, wherein steps a) to d) are repeated one or more times to print multiple layers of one or more energy curable ink or coating compositions.

10. The method of claim 9, wherein at least one of the energy curable ink or coating compositions is a white ink or coating.

11. The method of claim 9, wherein the first printed ink or coating layer is a white ink or coating.

12. The method of claim 11 wherein the first printed white ink or coating layer is overprinted with further inks, after being partially cured and pinned by UV radiation in step b), but prior to the electron beam curing of step d).

13. The method of claim 12, wherein the one or more inks printed onto the white layer are exposed to UV light prior to EB curing.

14. A process for preparing an article with a low migration ink or coating thereon comprising applying one or more ink or coating compositions according to the method of claim 1, wherein the electron beam dose of step d) is greater than or equal to 20 kGy with an accelerating voltage of greater than or equal 70 keV.

15. The process of claim 14, wherein the article is a food packaging article.

* * * * *